May 18, 1965   A. H. ZITTELL   3,183,702
METHOD OF AND APPARATUS FOR CUTTING
AND DEBURRING TUBES
Filed Nov. 21, 1960   7 Sheets-Sheet 1

INVENTOR.
ADAM H. ZITTELL
BY
William A. Zaluska
Attorney

INVENTOR.
ADAM H. ZITTELL
BY
William A. Zalesak
Attorney

Fig. 9.

INVENTOR.
ADAM H. ZITTELL
BY
William A. Zalesak
ATTORNEY

INVENTOR.
ADAM H. ZITTELL

May 18, 1965 A. H. ZITTELL 3,183,702
METHOD OF AND APPARATUS FOR CUTTING
AND DEBURRING TUBES
Filed Nov. 21, 1960 7 Sheets-Sheet 7

INVENTOR.
ADAM H. ZITTELL
BY
William A. Zalesak
ATTORNEY

United States Patent Office 3,183,702
Patented May 18, 1965

3,183,702
METHOD OF AND APPARATUS FOR CUTTING
AND DEBURRING TUBES
Adam H. Zittell, Wayne, N.J., assignor to Radio Corporation of America, a corporation of Delaware
Filed Nov. 21, 1960, Ser. No. 70,854
19 Claims. (Cl. 72—294)

This invention relates to a method of and apparatus for cutting a tube having a thin wall into short pieces of uniform length. More particularly, this invention relates to apparatus for cutting an elongated tube having very thin walls into sections of desired length, and deburring the cut-off end of the sections. One use for the so-produced tubular sections is as support sleeves for cathodes of vacuum tubes, or as cathode sleeves.

In one type of vacuum tube comprising concentric and cylindrical electrodes, the cathode comprises a cylinder with one end closed and has an electron emissive material applied to a portion of the cylindrical surface thereof. This cathode is supported in concentric relation with the other electrodes by a cylindrical cathode support tube over which the cathode is telescoped. This cathode support tube must be of uniform diameter and of uniform length and must not have burrs at the ends thereof in order to securely and accurately support the cathode and to permit telescoping of a cathode over the end of the support tube.

Furthermore, in the above-mentioned vacuum tubes, the cathode support sleeve may have a outside diameter of less than about a 1/16 of an inch as well as a wall thickness of about a 0.0005 of an inch. A tube made from such thin material is very fragile. The cutting of this thin tubing into proper lengths for cathode sleeves or cathode support sleeves involves difficulties due to the fact that the pressure thereon by the cutting tool may cause collapse of the tube wall. Also, upon cutting of the tubing wall to produce cathode support sleeves, burrs are produced which make it difficult to mount the closely fitting cathode on its support sleeve. Therefore, to be usable, the cathode support sleeve must not have any burrs thereon. Furthermore, deburring a sleeve which is 1/16 of an inch in diameter and which has a wall thickness of 0.0005 of an inch without distorting the sleeve, is a difficult time-consuming operation.

It is therefore an object of this invention to provide a method and apparatus for cutting very thin wall tubing into short uniform lengths, without collapsing or deforming the wall of the tubing.

It is a further object of this invention to provide a method and apparatus for deburring the cut ends of very thin wall metallic tubing without distorting the tubing.

A still further objects of this invention is to provide a method and apparatus for producing short, uniform length, deburred cylinders from continuously fed tubing.

My invention is used with apparatus which forms a thin metallic ribbon into a continuous tubular form having a welded lap seam.

In accordance with this invention, a floating mandrel is inserted into the continuous tube and it is fed to a cutting means, the internal floating mandrel preserving the shape of the tube while it is being cut. An extensible and rotatable mandrel is inserted into the end of the tube for positioning the floating mandrel and for preserving the tubular shape of a cut-off portion of the tube as the tube is being cut, as well as for deburring the ends of the cut-off portion. This invention includes the provision of the apparatus comprising the several clamps, the floating mandrel and the extensible and rotatable mandrel and the cutting means, as well as the sequencing means for causing operation thereof.

This invention may be understood upon reference to the drawings forming a part of this application and to the detailed explanation below.

Brief description of apparatus and operation thereof

Apparatus incorporating this invention and the method thereof will be first described in connection with FIGS. 1 to 8 which show the tube feeder, cutter and deburring mechansns in diagrammatic form and at their relative positions corresponding to the positions that these mechanisms take during the cycle of operation.

Figure 1:
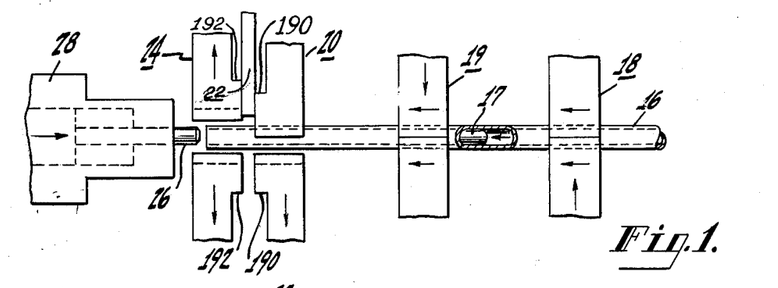
FIGS. 1 to 8 are schematic diagrams of the apparatus for making short tubular members of tube material and including the tube feeding, cutting and deburring mechanisms at various stages of operation and utilizing this invention.

A tube 16, which may be of one-half mil stock having a welded lap seam is fed from a source of supply, not shown. In accordance with this invention, a floating mandrel 17, that is, a rod which slidingly fits the inside of the tube 16, is inserted therein, with the flat forward end of the mandrel 17 flush with the end of the tube 16. A plurality of clamps 18, 19, 20 and 24 are spaced along the length of the tube 16. Each clamp comprises a pair of jaws at least one of which is movable between open and closed positions. Of these clamps, clamps 18 and 19 are mounted on a carriage and are moved back and forth along the direction of the length of the tube 16, and act as a tube feeding means. Clamps 20 and 24 are fixed in position and are spaced along the direction of motion of tube 16 beyond clamps 18 and 19. Clamps 18, 19 and 20 each comprises a jaw fixed with relation to its support and a second jaw movable toward and away from the fixed jaw. The fixed jaws of clamps 18, 19 and 20 are alternatively placed on opposite sides of the length of tube 16 and they thereby cooperate to form a guide for the tube 16 when any of the several clamps are open. The fixed jaws are the upper jaws (as shown in FIG. 1) of clamps 18 and 20 and the lower jaw of clamp 19. Clamp 24 comprises two movable jaws.

Clamps 20 and 24 have inwardly directed parallel faces 190 and 192 which are spaced apart the width of the cutting means 22. Means are provided for sliding the cutting means 22 back and forth between the parallel faces of the clamps 20 and 24. A mandrel 26 is mounted in mandrel holder 28 and the mandrel 26 is extensible in the direction towards the tube 16, and it is rotatable in its mandrel holder 28.

Operation of the apparatus of FIGS. 1 to 8 is as follows: As noted, a continuous lap welded tube 16, having a floating mandrel 17 in the end thereof, is threaded through the feeding clamps 18 and 19. The feeding clamps are then closed on the tube. Since, as noted above, clamps 18 and 19 are movable in the direction of the length of tube 16, upon movement of the clamps 18 and 19, tube 16, and floating mandrel 17 with it, are fed to the left through open clamp 20 and into open clamp 24 a predetermined distance. The cutting means 22, which slides between the parallel faces 190 and 192 of clamps 20 and 24 is withdrawn to its non-cutting position. The rotatable mandrel 26 is retracted and is not being rotated. At this time the parts are in the position as shown in FIG. 1.

Figure 2:
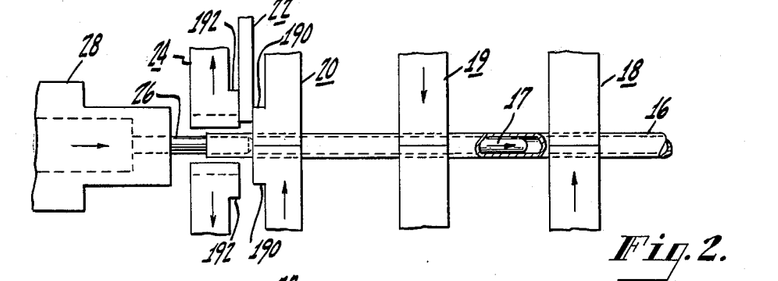
Figure 3:
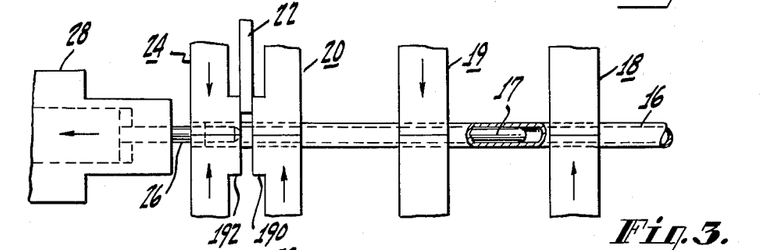

Next, the lower clamp jaw (as shown in FIG. 2) of clamp 20 is moved upwards, whereby the tube 16 is held by three clamps 18, 19 and 20. The mandrel 26 is then moved to the right through open clamp 24 and into the end of tube 16 so far as to push the floating mandrel 17 to the right until the face of the floating mandrel is flush with the left-hand face 190 of the clamp 20. Next, as shown in FIG. 3, the mandrel 26 is withdrawn until the end thereof is flush with right-hand face 192 of the clamp 24 and the clamp 24 is closed. In this position all of the clamps are closed on the tube 16.

Figure 4:
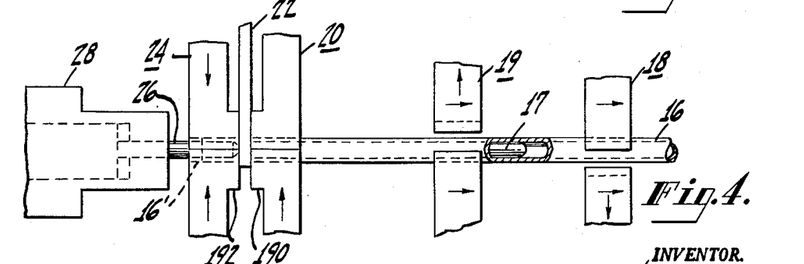

Then, the cutter means 22 is moved laterally of the tube 16 and between the faces 190 and 192 of the closed clamps 20 and 24 and is immediately withdrawn. By this action, the cutter cuts out the short portion of the tube which extends between the parallel faces 190 and 192 of the clamp 20 and 24. This short portion of tube is discarded. The remaining tube and the cut-off portion of tube are supported by the mandrels therein and therefore they are not distorted. Meanwhile, as shown in FIG. 4, the clamps 18 and 19 open and move to the right in preparation for further feeding movement.

Figure 5:
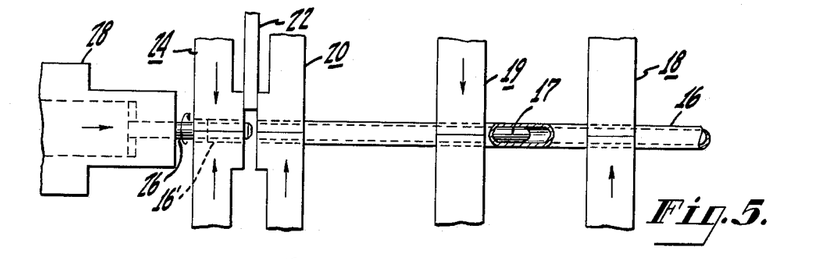
Figure 6:
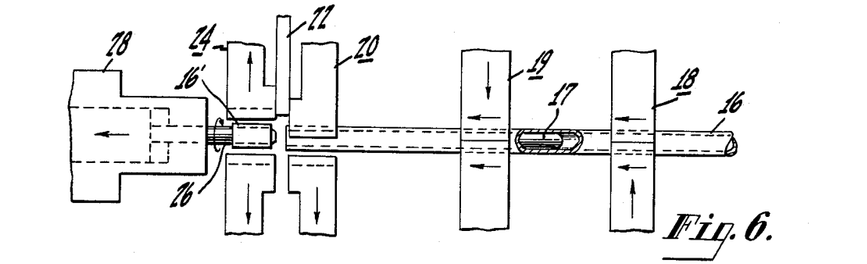

Clamps 20 and 24 remain closed and mandrel 26 is rotated and it is moved through the cut-off portion 16' of the tube 16 in clamp 24. Meanwhile clamps 18 and 19 close on the tube 16. This position is shown in FIG. 5. Clamps 20 and 24 are opened, while closed clamps 18 and 19 begin the feeding movement to the left. Also, rotating mandrel 26 moves to the left as shown in FIG. 6.

Figure 7:
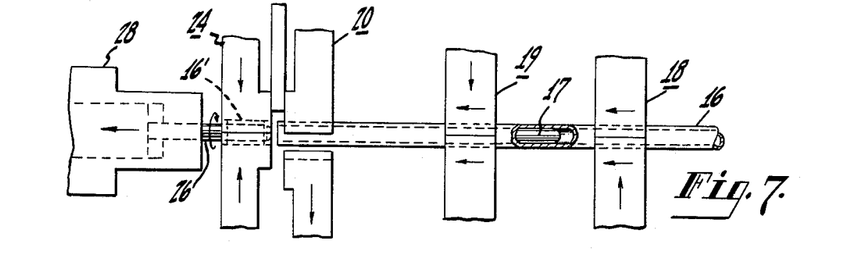

As shown in FIG. 7, clamp 20 remains open and closed clamps 18 and 19 continue to feed tube 16 to the left while clamp 24 closes on cut-off portion 16' of tube 16, which is on rotating mandrel 26. The cut-off portion 16' is fully within the confines of the clamp 24 and the rotating mandrel 26 extends through the cut-off portion 16'. This rotating action of the mandrel 26 in the closed clamp 24 causes deburring of the ends of the cut-off portion 16' of the tube 16.

Figure 8:
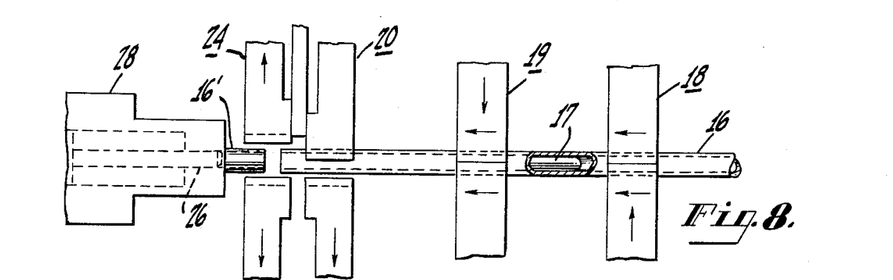

FIG. 8 shows clamps 18 and 19 still feeding tube 16, and with it the floating mandrel 17, while clamp 24 opens. Also, mandrel 26 is no longer being rotated and it is withdrawn into mandrel support 28. Since mandrel 26 fits mandrel support 28, the end of mandrel support 28 acts to strip the cut-off portion 16' from the mandrel 26 and the cut-off portion falls through open clamp 24, into a storage means (not shown). The closed clamps 18 and 19 continue to feed tube 16, and with it the floating mandrel 17, through open clamps 20 and 24, and the cycle is completed when the apparatus reaches the position shown in FIG. 1.

*Overall description*

A detailed description of the method and apparatus incorporating this invention follows, the above-mentioned reference characters being used to indicate portions of the apparatus which correspond to those diagrammatically indicated in FIGS. 1 to 8.

Figure 9:
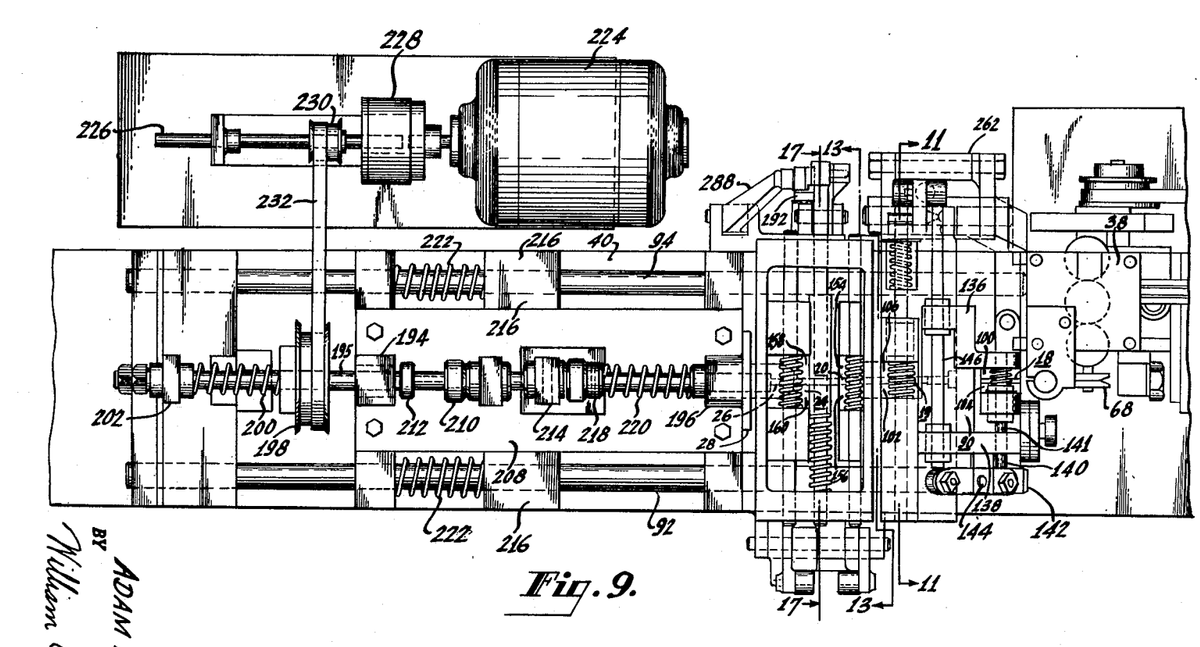
FIG. 9 is a plan view of apparatus for lap welding a tube a spaced intervals, for feeding and cutting the lap welded tube, and for deburring the cut-off portion thereof and incorporating this invention.
Figure 10:
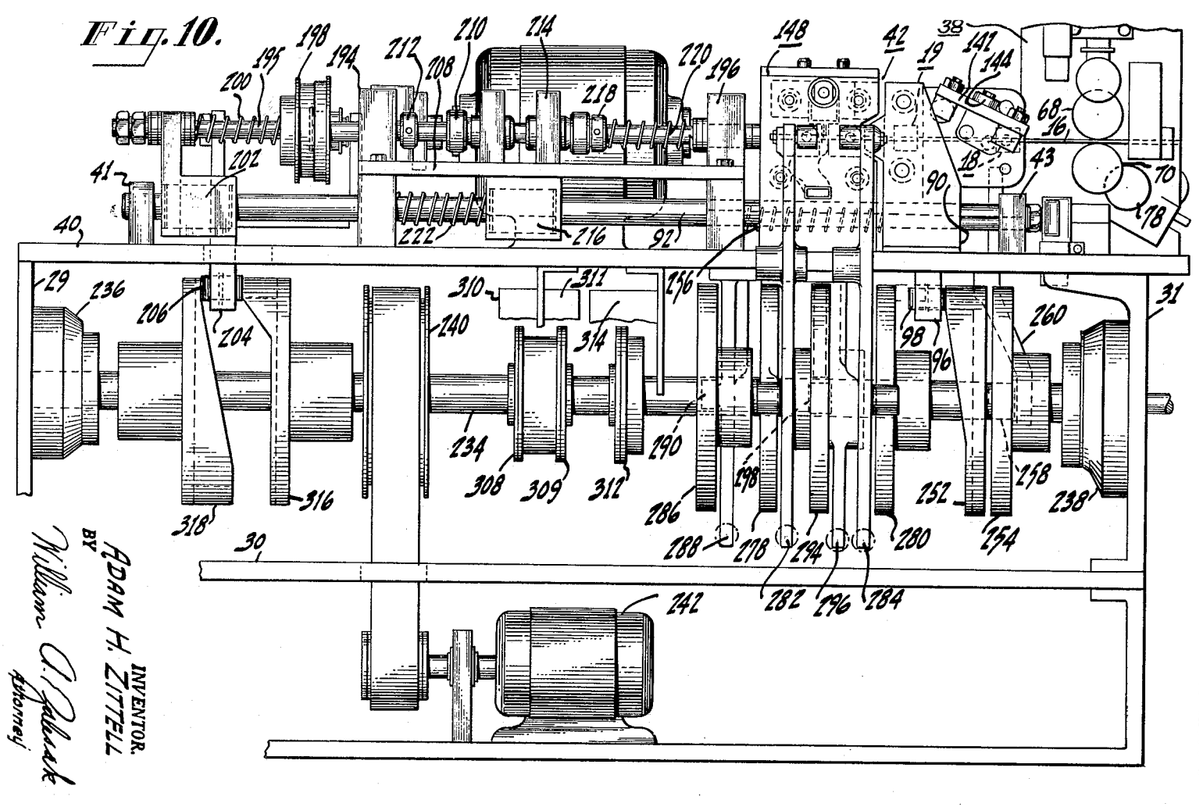
FIG. 10 is a side elevation of the apparatus shown in FIG. 9.

Atttention is directed to FIGS. 9 and 10. A base 30, shown in FIG. 10, is provided. A ribbon storage and feed means (not shown) are mounted to the right of base 30. The ribbon is formed into a lap seamed tube in a well known manner and is fed to welder 38 for welding the lapped seam. The elements for forming the ribbon into tubular form may be mounted to the right of support plate 40 which is supported on base 30 by vertical support plates 29 and 31. The welding means 38 is mounted on the plate 40 along the direction of motion of the ribbon.

The tube feeding, cutting and deburring means of this invention, generally indicated at 42, is also mounted on plate 40 and in line to receive the tube 16 that leaves the welder 38. The several cams for operating the apparatus 42, through link and lever mechanisms, are mounted between base 30 and support plate 40 and between the vertical plates 29 and 31.

The conventional welder 38, per se, from which lap seam welded tubing is fed into the tube cutter and deburrer of this invention, is described as appears necessary. The lap seam tube runs between rotatable welding electrodes 68 and 70 of spot welder 38. The lower electrode 70 is grounded to the body portion of the welder 38. The welding electrode 70 also acts as a feed tracking means since it is driven by frictional contact with drive means 78 which overlaps and contacts the face of electrode 70. The drive wheel 78 is driven by belt means (not shown). The upper electrode 68 is also in the form of a wheel. Current for welding purposes is fed to the upper electrode 68 in a conventional manner. Although welding electrodes 68 and 70 are rotatable, they do not function as feed wheels for feeding the tubing 16 to the left, but act merely as tracking means. These welding electrodes 68 and 70 are rotated only at such times as the tube feeder, cutter and deburring means 42 (to be explained) are in that portion of its cycle that admits of accepting further tubing. The means for intermittently rotating the electrodes is conventional and is not described in detail.

*Feeding mechanism*

As explained in connection with FIGS. 1–8, inclusive, the feeding portion of the mechanism 42 comprises two similar clamps 18 and 19 which are supported on a movable platform or slide housing. This mechanism includes a master cam shaft for rotatably supporting a plurality of cams and lever or link mechanisms connected between said clamps and the slide housing, and the cams for operating the clamps and for moving the slide housing. After the clamps have been closed on the tubing, the slide housing is moved in one direction toward the cutting mechanism to feed tubing to the cutter mechanism. The clamps are then opened to release the tubing which is then clamped by further clamps comprised in the cutting mechanism and the slide housing is moved in the opposite direction away from the cutting mechanism to place the clamps 18 and 19 in position to engage the tubing for further feeding.

The feeding portion of the mechanism 42 comprises two similar clamps 18 and 19, both of which are mounted on the frame or slide housing 90 (see FIGS. 9, 10 and 11) which rides on longitudinal rods or guides 92 and 94. These rods 92 and 94, which extend parallel to the direction of travel of tubing 16, are mounted and similarly supported on the top of support plate 40 by brackets 41 and 43. Dependent bracket 96 extends downwardly from the housing slide 90 (FIG. 11) through a slot 44 in the support plate 40 and carries a rotatable cam follower 98 for the purpose of moving the platform along the rods, and therefore along the path of travel of the tube, as will be more fully explained below.

The clamp 19 (FIG. 11) comprises a stationary jaw and cooperating with the stationary jaw 102 a movable jaw 106. To support the clamp jaws 102 and 106 on slide housing 90, I provide end plates 108 and 110, which are fastened to the lateral sides of slide 90. A block 112 is fixed to end plate 108 and extends towards end plate 110. The fixed jaw 102 is fixed to jaw holder 114 which is itself fixed by bolt means to block 112. Pins 116 and 118, which extend transversely of rods 92 and 94 and are supported in end plate 110 and block 112, provide guide rods for the support block 120 for movable jaw 106. Block 120 is slidably mounted on pins 116 and 118 by means of ball bearing assemblies 121 and 121'. Spring means 122 and 124 are mounted on pins 116 and 118, respectively, between block 112 and movable support block 120 and tend to keep clamp 19 open.

Figures 11, 12, 14, 15:
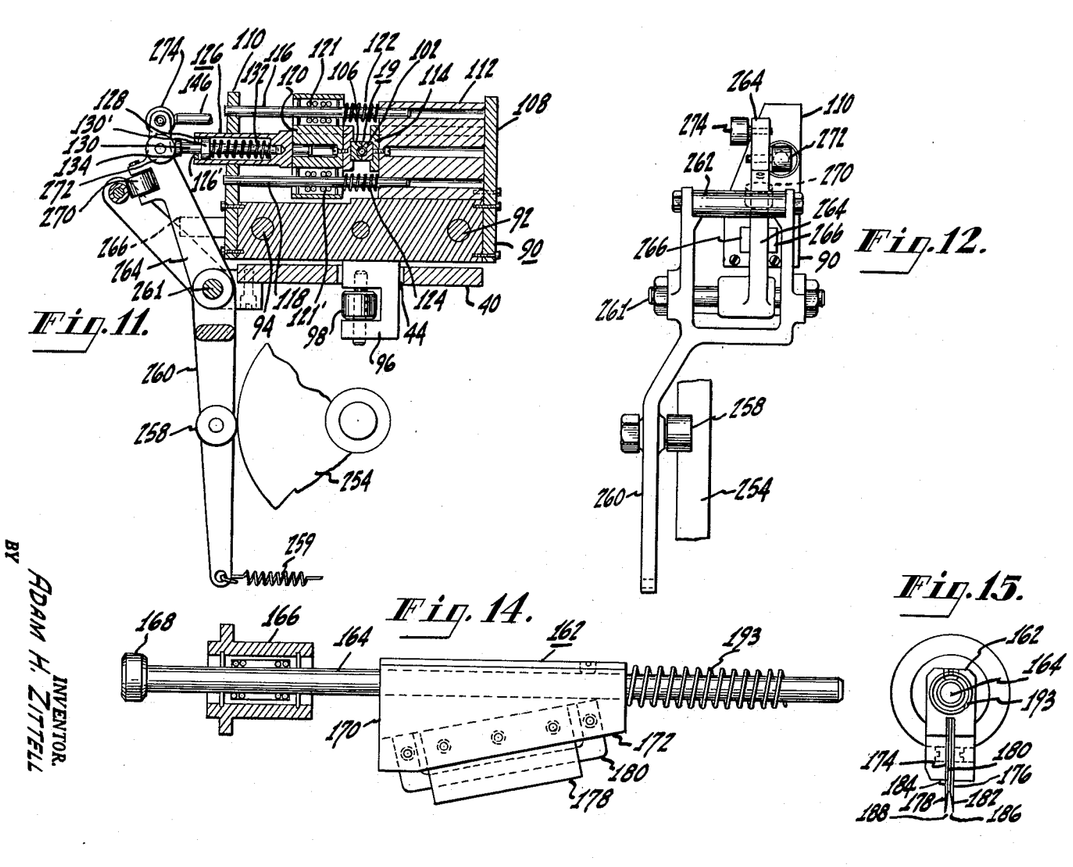
FIG. 11 is a cross-section taken along lines 11—11 of FIG. 9.
FIG. 12 is a left-end view of the lever mechanism shown in FIG. 11.
FIG. 14 is a side elevation of a cutter blade and cutter blade holding means made according to this invention.
FIG. 15 is a right-end view of FIG. 14.

A clamp jaw pusher 126, fastened to movable jaw support block 120 extends through end plate 110. This pusher 126 comprises a hollow tubular member 128 into the end of which is fitted a pin 130 having an enlarged portion 130'. A spring 132 presses between a shoulder in the hollow tubular member 128 and the enlarged portion 130' of the pin 130. A retaining cap means 126' prevents the rod 130 from being pushed out of the tubular member 128 by the spring means 132. Upon pushing on the end 134 of pin 130, the movable jaw support 120 moves to the right, carrying the movable jaw with it against the pressure of springs 122 and 124 and closes the clamp 19. However, to prevent damage to clamp 19, pin 130 may move further to the right after clamp 19 is closed, upon compression of spring 132, under the urging of a pushing means to be described.

Clamp 18 is similar in detail to clamp 19 described above. However, the stationary jaw 100 of clamp 18 is positioned on the same side of the tubing 16 as movable jaw 106 of clamp 19, while movable jaw 104 of clamp 18 is on the same side of the tubing 16 as stationary jaw 102 of clamp 19.

Stationary jaw 100 of clamp 18 is mounted on the support member 136 (FIG. 9) which is mounted on platform or slide housing 90. Cooperating movable jaw 104 is mounted on a pair of vertically spaced parallel rod guides, the upper rod 141 only being visible, these rods being mounted in the support member 138. Member 138 is also mounted on and fixed to platform 90. A diagonally positioned rocker arm 142 is mounted on member 138 and is pivoted thereon by pin 144. A push rod 146, which is slidably mounted in members 138 and 136, contacts rocker arm 142 at one end thereof. The other end of rocker arm 142 contacts tubular member 140 which corresponds to pin 130 and tubular member 128 of FIG. 11 and is attached to the movable clamp jaw 104. The other end of push rod 146 is contacted by the push means to be described. The movable jaw 104 of clamp 18 and the movable jaw 106 of clamp 19, although on opposite sides of tube 16, are moved to clamping position simultaneously as will be described.

Cutting mechanism

Figure 13:
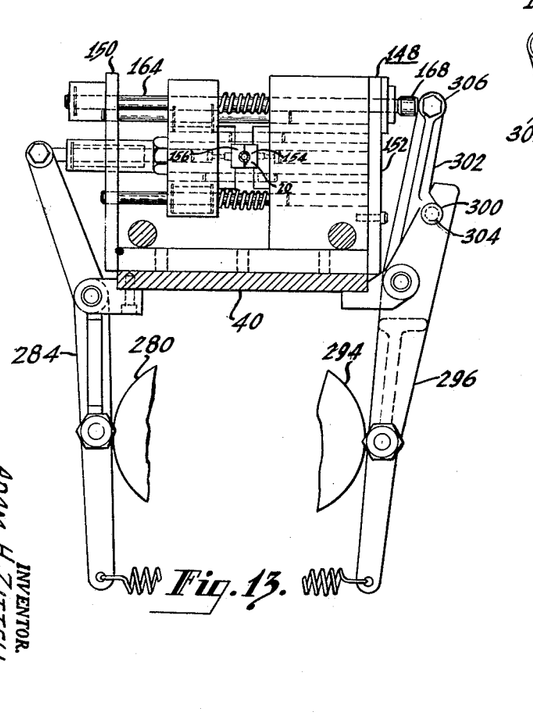
FIG. 13 is a cross-section taken along the lines 13—13 of FIG. 9.
Figure 16:
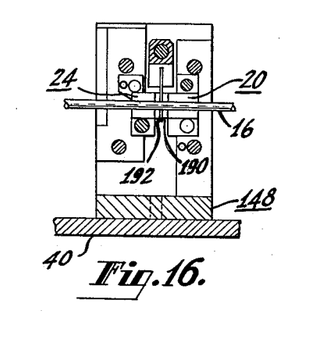
FIG. 16 is a sectional view of FIG. 17 on line 16—16 thereof.
Figure 17:
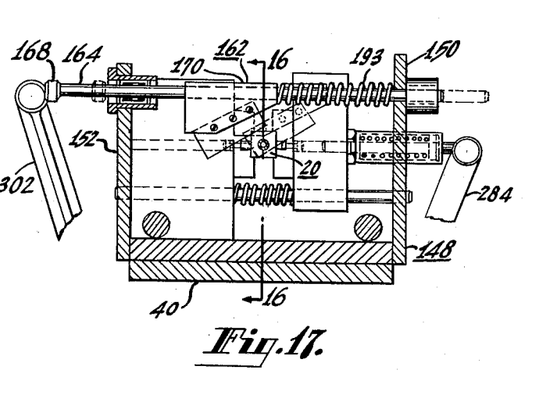
FIG. 17 is a sectional view of FIG. 9 on line 17—17 thereof and particularly showing the assembled position of the cutter means of FIG. 14 with respect to the clamps.
Figure 18:
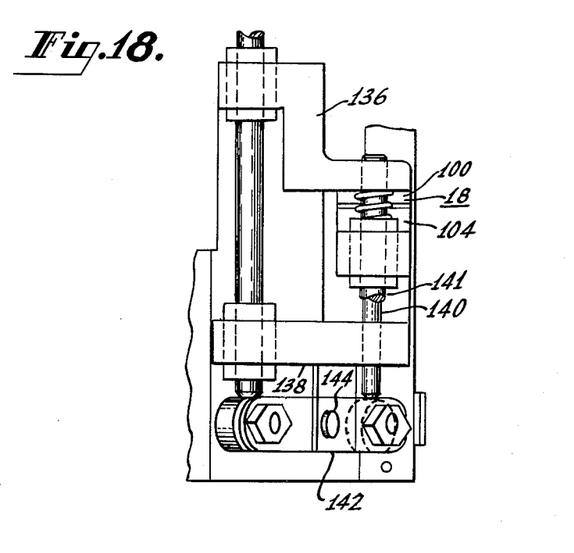
FIG. 18 is a plan view of a portion of this machine showing details of the means for operating clamps of this invention.

The cutting mechanism is shown in detail in FIGS. 13, 14, 15, 16 and 17 to which reference is now made. This mechanism comprises a pair of clamps 20 and 24 spaced longitudinally of the tubing 16 to be cut, the clamps being supported in a housing 148 mounted adjacent the feeding mechanism on support plate 40. One of the clamps 20 has one movable jaw and the other 24, two movable jaws, as described above. A cutting mechanism 162 is also slidably mounted in the housing and positioned to pass between the two clamps 20 and 24 so as to pass across the tubing to be cut. Suitable link and lever mechanisms are positioned on the frame, to engage control cams and the clamps and cutting mechanism to cause the clamps and cutting mechanism to function in proper programmed sequence to cut the tubing. Turning particularly to FIGS. 13, 16 and 17, the housing 148 is mounted on support plate 40. This housing 148 comprises side plates 150 and 152. Clamps 20 and 24 and cutter 22 are fitted between these side plates 150 and 152. Clamp 20 comprises a fixed jaw 154 and a movable jaw 156. The jaws 154 and 156 of clamp 20 have face portions 190 which extend in the direction of motion of the tube 16. (See FIGS. 1, 2 and 16.) Except for this and for the fact that the fixed jaw 154 is to the right of the tube 16 and the movable jaw 156 is to the left of tube 16, the clamp 20 is substantially identical to clamp 19 which has been described above. It will therefore be noted that the fixed jaw 100 of the clamp 18, the fixed jaw 102 of clamp 19 and the fixed jaw 154 of clamp 20 are alternatively arranged on opposite sides of tube 16 and therefore they fix the position of tubing 16 regardless of whether the clamps are open or closed.

Clamp 24 (FIG. 9) comprises two clamp jaws 158 and 160, both of which are movable. These jaws have face portions 192 (see FIGS. 1, 2 and 16) which extend towards the corresponding face portions 190 of clamp 20. Each clamping jaw, except for the extended face, is substantially identical with the above-described movable jaw of clamp 19.

As shown in FIG. 17, the cutting assembly indicated generally at 162 is supported by the housing 148 between plates 150 and 152 thereof. This cutting assembly 162 is shown in more detail in FIGS. 14 and 15. The cutting means 162 comprises a rod 164 which slides through bearings such as 166 in plates 150 and 152 (see FIG. 17). Rod 164 is provided with a head 168. The generally rectangular blade holder 170 (FIG. 14) is fixedly mounted on rod 164 and the lower edge 172 of the blade holder 170 is formed to provide an up-slanting portion in the direction away from the head 168. The blade holder 170 also has a slot 174 through the length thereof for reception of a pair of blades 176 and 178. A spacer and blade bracing means 180 may be inserted into the slot 174 between blades 176 and 178 for the purpose of adjusting the distance between the outside surfaces of the blades to the space available therefor. The blades themselves have outside flat surfaces 182 and 184 and inner oppositely disposed beveled surfaces 186 and 188, respectively. The blades are so mounted in blade holder 170 that the flat surfaces 182 and 184 are parallel, and the distance between them determines the length of the cut-out portion of tubing 16 which is discarded. The cutters are also so arranged that the cutting edges thereof are parallel and slanted upwards in the direction of the rod 164 away from the head 168. As shown in FIG. 17, the cutter assembly 162 is mounted to slide in housing 148 with rod 164 extending through plates 150 and 152. The cutter also slides between adjacent faces 190, 192 of clamps 20 and 24, as shown in FIG. 16. These adjacent faces 190 and 192 define a guide and cooperating surfaces for cutting blades 176 and 178. The spring 193, which is mounted on rod 164 between cutter blade holder 170 and plate 150, urges cutting blade holder 170 to its noncutting position. When the lever 302 is actuated by its controlling cam, the rod 164 is moved to the right (FIG. 17) against biasing spring 193 to cut the tubing 16.

Deburring mechanism

Figure 9A:
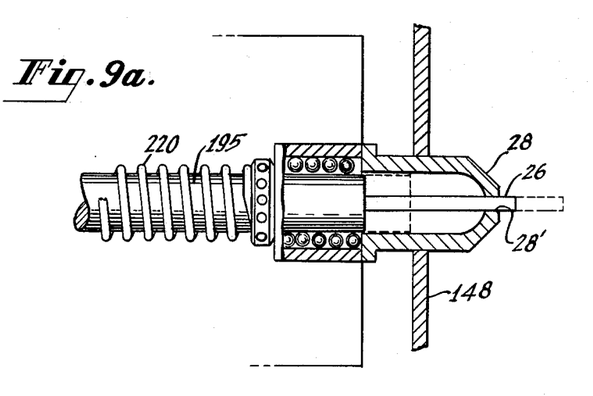
FIG. 9a is a fragmentary portion of FIG. 9, showing details of the rotatable and extensible mandrel and its holder.

The deburring mechanism is shown in FIGS. 9, 10 and 9a, to which reference is now made.

The mandrel used for the deburring operations and for positioning the floating mandrel in the uncut tubing is mounted in and fixed to a rotatable and axially slidable shaft mounted in a pair of spaced supports attached to the apparatus frame next to the cutter assembly. The rotatable mandrel is mounted in axial registry with the floating mandrel. A driving motor is coupled to the shaft. A cam and link mechanism is connected to the shaft for producing axial movement of the shaft and mandrel during operation of the apparatus.

The deburring and positioning mandrel 26 is fixed to the rotatable and axially slidable shaft 195. The mandrel 26 and shaft 195 are rotatably and slidably supported in the support members 194 and 196 mounted on plate 40. The mandrel housing or holder 28 is fixed to the support 196 and extends into the cutter housing 148. It is provided with an aperture 28' through which the mandrel 26 is slidably extended. The mandrel 26 is in axial registry with the floating mandrel 17.

The driving mechanism for rotating shaft 195 includes a pulley 198 mounted fixedly thereon. The outer end of shaft 195 is rotatably received by carriage 202. Carriage 202 is slidably mounted on the guide rods 92 and 94 and is provided with a dependent lug 204 on which a rotary cam follower 206 is mounted. A biasing spring 200 is mounted on shaft 195 between carriage 202 and pulley 198 and urges the pulley 198, and therefore the shaft 195, to the right with respect to the carriage 202. A plate 208 extends between bearing supports 194 and 196 and an adjustable stop 210 is fixed to the plate 208. The collar 212 which is fastened to the shaft 195 limits motion of shaft 195 in the direction toward the several clamps by contact with the adjustable stop 210. The floating stop 214 on shaft 195 (which co-acts with collar 218 mounted on shaft 195), extends down through plate 208 and is slidably mounted on guide rods 92 and 94 as shown at 216, FIG. 10. A spring 220, which is weaker than spring 200, is mounted on shaft 195 between collar 218 and support bearing 196. A spring 222 is mounted on each rod 92 and 94 between the support bearing 194 and the lower end of slidable bearing 216. The springs 222 are stronger than the spring 220. By cooperation of the several springs 200, 220 and 222, the shaft 195 is urged in the direction of the several clamps aforementioned. Floating stop 214 yieldingly limits the motion of shaft 195 to the right.

As noted above, the shaft 195 is rotated at suitable intervals. The means for causing such rotation comprises a motor 224 which runs continuously, driving a shaft 226 through an electromagentic clutch 228. A pulley 230 fixedly mounted on shaft 226 is coupled to pulley 198 on shaft 195 by narrow belt 232. Pulleys 198 and 230 have wide faces whereby the belt 232 takes such position on the pulleys 198 and 230, upon sliding of shaft 195, as to avoid excessive stretching of belt 232. Thereby, upon energization of clutch 228, shaft 195 and therefore mandrel 26 are rotated.

*Link and cam mechanisms for operating clamps, cutter and deburring mandrel*

The link and cam mechanisms for operating the clamps, the cutter and the deburring mandrel are shown in FIGS. 9, 10, 11, 12, 13, 17 and 18.

Mounted beneath the mechanism described above is a master cam shaft rotatably supporting a plurality of cams having the desired contour for bringing about the desired time sequence of operations of the various clamps, the cutter and the deburring mandrel. Pivotally mounted links and levers have cam followers thereon engaging the contour surfaces of the cams, and having at an end thereof pushers for the various clamps and the cutter. The carriage for axially moving the deburring mandrel shaft has a follower as described above which also engages the contour surface of one or the cams on the master cam shaft.

The master cam shaft 234 is rotatably mounted between the plate 40 and base 30 and is supported in bearings 236 and 238 in vertical plates 29 and 31. The shaft 234 has a pulley 240 mounted thereon and this pulley is driven by motor 242 in a known manner.

The means for closing the clamps 18 and 19 and for moving the slide housing or carriage 90 on which they are mounted (FIGS. 9, 10, 11 and 12) comprises face cam 252 and profile cam 254 each secured to the shaft 234 and located below the plate 40 in the vicinity of the carriage 90. The face of face cam 252 contacts roller 98 on carriage 90 and pushes it to the left, as shown in FIG. 10, against the force applied by springs 256 mounted on rods 92 and 94 between the carriage 90 and support 196.

The profile cam 254, by contact with cam follower 258, FIGS. 10, 11 and 12, rocks lever 260, on which cam follower 258 is mounted, about its pivot pin 261 which is mounted on support plate 40. A spring 259 keeps the cam follower 258 against the cam 254. The upper end of lever 260 is bifurcated and, as shown in FIGS. 9 and 12, a bar 262 is mounted between the bifurcation thereof.

A short lever 264 is mounted by means of a suitable slidable bearing on the pivot pin 261 and between the legs of the bifurcated lever 260. This short lever is caused to move with carriage 90 by pins 266 (FIGS. 11 and 12) embracing the short lever 264 and projecting from plate 110 which is fastened to carriage 90.

Near the upper end thereof, the short lever 264 carries a roller 270 which bears against the bar 262. The short lever 264 also carries two further rollers, one extending from each side of lever 264. These rollers rotate on an axis parallel to the rods 92 and 94. These rollers 272 and 274 bear respectively on the end 134 of push pin 130 and the end of push rod 146. Thereby, as cam 254 rotates, lever 260 is rocked about its pivot pin 261. By contact of roller 270 carried by short lever 264 on bar 262 carried by lever 260, short lever 264 also rocks about pivot pin 261. Since the short lever is embraced by pins 266, it slides along pivot 261 with the carriage 90, and roller 270 rolls along, and remains in contact with, bar 262. In this manner, rollers 272 and 274 remain in contact with their push pin and rod 130 and 146, respectively, although the carriage 90 on which the push pin 130 and push rod 146 are mounted, move axially of support rods 92 and 94. Thereby, as cam 254 rotates, movable jaws 104 and 106 of clamps 18 and 19, respectively, move in accordance with the shape of the profile of cam 254 regardless of the position of carriage 90.

Means are also provided for moving the movable jaw 156 of clamp 20 and both jaws 158 and 160 of clamp 24. This means comprises three profile cams 278, 280 and 286 mounted for rotation with shaft 234 and below the housing 148 for these clamps 20 and 24. Two levers 282 and 284 are pivotally mounted on the edge of table 40 and on the front thereof as shown in FIG. 10. These two levers each carry cam followers which cooperate respectively with cams 278 and 280, and upper ends of these levers contact push pins to operate the clamp jaws 160 and 156, respectively. The further profile cam 286 is also mounted on shaft 234 for rotation therewith. The lever 288, pivoted on plate 40 at the back thereof, has a follower 290 which contacts the cam 286. The upper end of the lever 288 contacts the push rod 292 (FIG. 9) for movable jaw 158 of clamp 24. Thereby, upon rotation of cams 280, 278 and 286, the movable clamp jaw 156 of clamp 20 and the movable clamp jaws 158 and 160 of clamp 24 move in accordance with the shape of the cams 280, 278 and 286. The lever 288, as will be noted, is bent to make room for the cam and lever assembly for operating the cutting tool 162 which is now described.

A cam 294, for operating cutting tool 162, is also mounted for rotation on shaft 234. A lever 296, which is pivoted on plate 40 at the back thereof, has mounted thereon a cam follower 298 which contacts cam 294. The upper end of lever 296 (see FIG. 13) is bifurcated and has notches 300 in the legs thereof. Short lever 302 is mounted between the legs of the lever 296 and a pin 304 which fits into notches 300 extends through a hole in lever 302. The upper end of lever 302 carries a roller 306, which contacts the head 168 of cutter rod or shaft 164. Thereby, upon rotating of cam 294, the cutter is moved in accordance with the shape of the face of the cam 294. The pin 304 may be a shear pin, whereby upon excessive resistance to the motion of the cutting assembly 162, the pin shears and cutting ceases. Also, upon removal of pin 304, short lever 302 may be rotated away from the cutter assembly to permit removal of the cutter assembly 162 for necessary servicing.

The spot welding device is energized to spot weld the lap seam tube only when it is moving so that it will not be burned when it is stationary. To accomplish this, a micro-cam 308, mounted on shaft 234, operates micro-switch 310 (shown partly broken away) to cause energization of welder 38 only during the feed portion of the cycle of this machine. Therefore, the welder will be energized only during the motion of tube 16 and no burning thereof will take place, which would result if tube 16 were stationary during welding thereof.

The micro-cam 309, also mounted on shaft 234, operates micro-switch 311 (also partly broken away) to cause energization of the mechanism (not shown) that causes rotation of welder electrode 70. Thereby, the electrodes 68 and 70 track with the tube feed means during the welding operation.

As stated above, the mandrel 26 is rotated during part of the cycle of this machine upon energization of magnetic clutch 228. To cause properly timed energization of magnetic clutch 228, a further micro cam 312 is mounted on shaft 234 and causes properly timed closure of micro switch 314 (also partly broken away), which in turn causes properly timed energization of magnetic clutch 228 and properly timed rotation of mandrel 26.

Cam means are provided to cause axial movement of mandrel 26. This cam means comprises two face cams 316 and 318 mounted on shaft 234 for rotation therewith and each contacting opposite sides of roller 206, whereby, upon rotation of shaft 234, cam 318 pushes the carrier 202, and thereby the mandrel 26, to the right, as seen in FIGS. 9a and 10, while cam 316 pushes the mandrel 26 to the left, each in accordance with the shape of the face of the respective cams. The cam 316 acts as a stripper cam and pushes the extensible mandrel 26 to the left through its mandrel holder 28 to positively strip cut tube 16' off of mandrel 26. In so doing, shaft 195, to which mandrel 26 is fixed, moves so far to the left as to cause floating stop 214 to compress spring 232. By using two cams, accurate positioning of the mandrel at critical portions of the cycle can be assured.

What is claimed is:

1. The method of forming a length of tubing from continuous thin wall tube, with the aid of a floating mandrel in said tube, said floating mandrel slidably fitting within said tube so as to provide support therefor, said method comprising inserting a second mandrel into said tube and thereby pushing said floating mandrel back into said tube, said second mandrel slidably fitting within said tube so as to provide support therefor, retracting said second mandrel, whereby a section of tubing remains between said mandrels, and cutting out said section of tubing, whereby a length of tubing remains on said second mandrel.

2. The method of deburring a cut-off length of tubing which is on a mandrel which slidably fits within and provides support for said tubing, said method comprising the steps of so moving said mandrel with respect to said length of tubing that the length of tubing surrounds the mandrel intermediate the ends thereof, clampingly engaging said tubing and rotating said mandrel with respect to said tubing while said tubings clampingly engage.

3. The method of forming a deburred length of tubing from a continuous thin-walled tube with the aid of a floating mandrel in said tube, said floating mandrel slidably fitting within said tube so as to provide support therefor, said method comprising inserting a second mandrel into said tube, said second mandrel slidably fitting within said tube so as to provide support therefor, and thereby pushing said floating mandrel back into said tube, retracting said second mandrel, whereby a short section of tubing remains between said mandrels, cutting out said section of tubing, whereby a length of tubing remains on said second mandrel, advancing said second mandrel with respect to said length of tubing to the point where the advancing end of said second mandrel extends beyond the end of said length of tubing and rotating said mandrel with respect to said tubing.

4. The method of forming a deburred length of tubing from a continuous thin walled tube, with the aid of a floating mandrel in said tube, said floating mandrel slidably fitting within said tube so as to provide support therefor, and a second mandrel which slidably fits within and provides support for said tube, said method comprising feeding said tube and with it said floating mandrel in a given direction, inserting said second mandrel into said tube and thereby pushing said floating mandrel back into said tube, clamping said tube along the length of said floating mandrel, cutting off said tube flush with an end of said floating mandrel, clamping the cut-off portion of tubing along the full length thereof while said second mandrel internally supports the cut-off portion of tubing along the full length thereof, and rotating said second mandrel with respect to said cut-off portion.

5. The method of forming a deburred length of tubing from a continuous thin walled tube with the aid of a floating mandrel in said tube, said floating mandrel slidably fitting within said tube so as to provide support therefor, and a second mandrel which slidably fits within and provides support for said tube, said method comprising feeding said tube and with it said floating mandrel in a given direction, inserting said second mandrel into said tube and thereby pushing said floating mandrel back into said tube, clamping said tube along the length of said floating mandrel, cutting off said tube flush with the end of the floating mandrel, clamping the cut-off portion of tubing along the full length thereof while said second mandrel internally supports the cut-off portion of tubing along the full length thereof, rotating said second mandrel with respect to said cut-off portion, stripping said cut-off portion off of said second mandrel, and repeating the above method steps while retaining said floating mandrel in said tubing.

6. The method of forming a deburred length of tubing from a continuous thin wall tube comprising the steps of inserting a floating mandrel into an end of said tube, said floating mandrel slidably fitting within said tube so as to provide support therefor, feeding said tube in a given direction, inserting a second mandrel into the end of said tube and thereby pushing said floating mandrel back into said tube, said second mandrel slidably fitting within said tube so as to provide support therefor, clamping said tube along the length of said floating mandrel, cutting off said tube flush with the end of said floating mandrel, clamping the cut-off portion of tubing along the full length thereof while said second mandrel internally supports the cut-off portion of tube along the full length thereof, rotating said second mandrel with respect to said cut-off portion, stripping said cut-off portion off of said second mandrel and repeating the aforesaid method steps while retaining said floating mandrel in said tubing.

7. The method of forming deburred length of tubing from a continuous thin walled tube and including a floating mandrel in the tube, said floating mandrel slidably fitting within said tube so as to provide support therefor, a second mandrel which slidably fits within and provides support for said tube, and a plurality of clamps, said method comprising clamping one of said plurality of clamps on said tube, moving said clamp and thereby said tube and said floating mandrel in one direction and through a second of said clamps, inserting said second mandrel into the leading end of said tube and thereby pushing said floating mandrel back into said tube while continuing to move said tube in said given direction through said second clamp and into a third of said clamps, until the end of said floating mandrel is flush with a surface of said second clamp, withdrawing said second mandrel until the end of said second mandrel is flush with a surface of said third clamp, cutting out the portion of tube between said second and third clamps, whereby a length of tubing remains on said second mandrel, moving said second mandrel with respect to said length of tubing to the position where the leading end of said second mandrel extends beyond said length of tubing, clamping said length of tubing along the full length thereof within said third clamp and rotating said second mandrel while performing said last-mentioned clamping step.

8. Apparatus for deburring a cut-off portion of a tube comprising a clamp, a mandrel, means for advancing said mandrel through said clamp and for extending said mandrel so that the end thereof extends through and beyond the cut-off end of said cut-off portion, means for retracting said mandrel and tube together whereby the complete length of said cut-off portion is contained within said clamp, means for closing said clamp on said cut-off portion and on said mandrel, and means for rotating said mandrel while the clamp is closed.

9. Apparatus for cutting a tube comprising a floating mandrel carried inside of said tube, a pair of clamps for gripping said tube at spaced positions along the length thereof, said clamps having spaced adjacent parallel faces, mandrel means for pushing said floating mandrel into said tube until the end of the floating mandrel is flush with the face of one clamp, means for withdrawing said mandrel means until the end thereof is flush with the adjacent face of the other of said pair of clamps, and means to cut said tube flush with said ends of said mandrels.

10. Apparatus for deburring a cut-off portion of a tube comprising a clamp for receiving and clamping said cut-off portion in fixed position, a mandrel, a mandrel supporting means mounted adjacent said clamp and movable toward and from said clamp, said mandrel and said supporting means being rotatable, said mandrel being in axial register with said cut-off portion of a tube when clamped within said clamp, means for moving said mandrel supporting means toward said clamp and to advance one end of said mandrel through said cut-off portion of the tube and past the cut end thereof, means for closing and opening said clamp, and means connected to said mandrel for rotating said mandrel to debur the cut end of the cut-off portion of said tube when said cut-off portion is received entirely within said clamp and said clamp is closed and said mandrel is extended through the cut end of said tube.

11. Apparatus for deburring a cut-off portion of a tube comprising a clamp adapted to clamp said portion, means for opening and closing said clamp, a mandrel, means for advancing and retracting said mandrel, and means for rotating said mandrel, said mandrel extending into said clamp, and sequencing means to cause the mandrel to pass through said portion, the clamp to open, the mandrel to be retracted causing said cut-off portion to be entirely within the clamp, the clamp to close on said cut-off portion and the mandrel to rotate, whereby the cut-off portion of the tube is deburred.

12. Apparatus for forming deburred lengths of tubing from an elongated thin walled tubing, including an intermittent feeding mechanism adapted to engage said elongated thin walled tubing and move said elongated thin walled tubing along a predetermined path, floating means adapted to be received within said elongated thin walled tubing and to move therewith between cutting operations and to prevent deformation of the elongated thin walled tubing during cutting operations, a cutting mechanism along said path to which said tubing and said floating means are fed intermittently a predetermined distance, said cutting mechanism including clamping means for fixing said thin walled tubing and said floating means during cutting operations, means operatively associated with said cutting means and adapted to be received within the end of the thin walled tubing to be cut for preventing deformation of said thin walled tubing during cutting operations and for deburring the end of the cut length of tubing.

13. Apparatus for forming deburred lengths of tubing from an elongated thin walled tubing, including an intermittent feeding mechanism adapted to engage said elongated thin walled tubing and move said elongated thin walled tubing along a predetermined path, floating means adapted to be received within said elongated thin walled tubing and to move therewith between cutting operations and to prevent deformation of the elongated thin walled tubing during cutting operations, a cutting mechanism along said path to which said tubing and said floating means are fed intermittently a predetermined distance, said cutting mechanism including clamping means for fixing said thin walled tubing and said floating means during cutting operations, means operatively associated with said cutting means and adapted to be received within the end of the thin walled tubing to be cut for preventing deformation of said thin walled tubing during cutting operations and for deburring the end of the cut length of tubing, said last means being movable to position said floating means within said elongated thin walled tubing to prepare said apparatus for another cutting operation.

14. Apparatus for forming short deburred lengths of tubing from an elongated thin walled tubing, including a feeding mechanism adapted to intermittently engage said elongated thin walled tubing and move said elongated thin walled tubing along a predetermined path, a floating mandrel means adapted to be received within said elongated thin walled tubing and to move therewith between cutting operations and to prevent deformation during cutting operations, a cutting mechanism to which said tubing and said slidable means are fed intermittently a predetermined distance, mandrel means operatively associated with said cutting means and adapted to be received within the end of said tubing to be cut for preventing deformation of said tubing during cutting operations and for deburring the end of the cut length of tubing, said cutting mechanism including clamping means for fixing said thin walled tubing and said mandrels during cutting operations, said last mandrel means being movable to position said floating mandrel means within said elongated thin walled tubing to prepare said apparatus for another cutting operation.

15. Apparatus for forming relatively short deburred lengths of tubing from a continuous thin walled tube fed into said apparatus, said apparatus including a feeding mechanism comprising clamping means for intermittently clamping and feeding thin walled tube into said apparatus, a floating mandrel adapted to be received entirely within the end to be cut of said continuous thin walled tube and having one end spaced a predetermined distance from the end to be cut of said continuous thin walled tube, a cutting mechanism into which said tubing and mandrel are fed a predetermined distance, said cutting mechanism including a pair of closely spaced clamping means opposite each other along said tubing for clamping said continuous thin walled tube during cutting operations, a movable cutter positioned to pass between said pair of clamping means and through said tubing during cutting operations, a rotatable and axially movable mandrel spaced from and axially registering with said floating mandrel and adapted to be received within the end to be cut of said continuous thin walled tubing, said pair of clamping means clamping said continuous thin walled tubing and the mandrels therewithin during cutting operations.

16. Apparatus for forming relatively short deburred lengths of tubing from a continuous thin walled tube fed into said apparatus, said apparatus including a feeding mechanism comprising clamping means for intermittently clamping and feeding thin walled tube into said apparatus, a floating mandrel adapted to be received entirely within the end to be cut of said continuous thin walled tube and having one end spaced a predetermined distance from the end to be cut of said continuous thin walled tube, a cutting mechanism into which said tubing and mandrel are fed a predetermined distance, said cutting mechanism including a pair of closely spaced clamping means opposite each other along said tubing for clamping said continuous thin walled tube during cutting operations, a movable cutter positioned to pass between said pair of clamping means and through said tubing during cutting operations, a rotatable and axially movable mandrel spaced from and axially registering with said floating mandrel and adapted to be received within the end to be cut of said continuous thin walled tubing, said pair of clamping means clamping said continuous thin walled tubing and the mandrels therewithin during cutting operations, and means for moving said rotatable mandrel axially through a cut length of said tube and to rotate said rotatable mandrel to debur the last cut end of the short length of tubing.

17. Apparatus for forming relatively short deburred lengths of tubing from a continuous thin walled tube fed into said apparatus, said apparatus including a feeding mechanism comprising clamping means for intermittently clamping and feeding thin walled tube into said apparatus, a floating mandrel adapted to be received entirely within the end to be cut of said continuous thin walled tube and having one end spaced a predetermined distance from the end to be cut of said continuous thin walled tube, a cutting mechanism into which said tubing and mandrel are fed a predetermined distance, said cutting mechanism including a pair of closely spaced clamping means opposite each other along said tubing for clamping said continuous thin walled tube during cutting operations, a movable cutter positioned to pass between said pair of clamping means and through said tubing during cutting operations, a rotatable and axially movable mandrel spaced from and axially registering with said floating mandrel and adapted to be received within the end to be cut of said continuous thin walled tubing, said pair of clamping means clamping said continuous thin walled tubing and the mandrels therewithin during cutting operations, and means for moving said rotatable mandrel axially through a cut length of said tube and to rotate said rotatable mandrel to debur the last cut end of the short length of tubing, and to contact and position said floating mandrel for successive cutting operations.

18. Apparatus for forming relatively short deburred lengths of tubing from a length of thin walled tubing, said apparatus including a feeding mechanism for intermittently feeding thin walled tubing along a predetermined path, a floating mandrel adapted to be received within said length of thin walled tubing with one end of said mandrel spaced a predetermined distance from the end of said length of thin walled tubing to be cut, a cutting mechanism into which said tubing and mandrel are fed a predetermined distance, said cutting mechanism including a pair of closely spaced clamping means positioned opposite each other along said tubing, a movable cutter positioned to pass between said pair of clamping means and through said tubing during cutting operations, a rotatable and axially movable mandrel spaced from and in axial registry with said floating mandrel and adapted to be received within the end of said length of thin walled tubing during cutting operations, said clamping means being adapted to clamp said length of thin walled tubing and said mandrels during cutting operations, and means for moving said rotatable mandrel axially through a cut length of said tubing to debur the last cut end of said cut tubing and to contact and position said floating mandrel within the length of thin walled tubing for another cutting operation.

19. Apparatus for feeding and cutting a tubular member and for deburring and stripping a cut-off portion of said tubular member, there being a floating mandrel in said tubular member, said means comprising a first clamping means, means to close said first clamping means on said tubular member along the length thereof, means to move said first clamping means in a direction parallel to said tubular member and through a second and a third clamping means, said second and third clamping means having parallel faces which are separated by a predetermined distance, a cutting means comprising a pair of parallel cutting surfaces defining the width of said cutting means, said width being equal to said predetermined distance, a second mandrel extending through said third clamping means and into said tubular member, means to move said second mandrel in a direction towards said movable clamping means to the parallel face of said second clamping means, whereby said floating mandrel is pushed into said tubular member until the end thereof is in flush relation with the parallel surface of said second clamping means, means to withdraw said second mandrel until its end is in flush relation with the parallel face of said third clamping means, means to close said second and third clamp on said tubular member and means to move said cutting means between the two parallel faces of said second and third clamping means and into cutting relation with said tubular member whereby the portion of said tubular member surrounding said second mandrel is separated from the remainder thereof, means for advancing said second mandrel through said separated portion, means for retracting said mandrel and said separated portion whereby the complete length of said spaced portion is contained in said third clamping means, means for rotating said second mandrel with respect to said separate portion, whereby said separate portion is deburred, and means for withdrawing said second mandrel from within said separate portion, whereby said separate portion is stripped from said second mandrel.

References Cited by the Examiner
UNITED STATES PATENTS

| 541,996 | 7/95 | Fox. | |
| 771,752 | 10/04 | Stafford. | |
| 873,583 | 12/07 | Nichols | 15—88 |
| 1,715,138 | 5/29 | Lothrop | 83—179 X |
| 2,225,127 | 12/40 | Oppenheim. | |
| 2,267,435 | 12/41 | Thomas | 15—88 X |
| 2,518,433 | 8/50 | Friedman. | |
| 2,907,234 | 10/59 | Wade et al. | 77—73 |

WHITMORE A. WILTZ, *Primary Examiner.*

HYLAND BIZOT, JOHN F. CAMPBELL, *Examiners.*